United States Patent
Glain et al.

(10) Patent No.: US 11,299,275 B2
(45) Date of Patent: Apr. 12, 2022

(54) REMOVABLE MODULAR PRIVACY ASSEMBLY

(71) Applicant: Safran Seats USA LLC, Gainesville, TX (US)

(72) Inventors: Arthur Glain, Boulogne-Billancourt (FR); Oscar Ruiz Lara, Versailles (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/270,934

(22) PCT Filed: Aug. 24, 2018

(86) PCT No.: PCT/IB2018/056456
§ 371 (c)(1),
(2) Date: Feb. 24, 2021

(87) PCT Pub. No.: WO2020/039236
PCT Pub. Date: Feb. 27, 2020

(65) Prior Publication Data
US 2021/0206494 A1  Jul. 8, 2021

(51) Int. Cl.
*B64D 11/06* (2006.01)
*B60N 2/885* (2018.01)
(52) U.S. Cl.
CPC .......... *B64D 11/0606* (2014.12); *B60N 2/885* (2018.02)
(58) Field of Classification Search
CPC   B64D 11/0606; B64D 11/0642; B60N 2/882; B60N 2/885
See application file for complete search history.

(56) References Cited

U.S. PATENT DOCUMENTS

| 4,031,578 A | * | 6/1977 | Sweeney | ................ A47C 7/383 5/426 |
| 4,440,443 A |   | 4/1984 | Nordskog | |

(Continued)

FOREIGN PATENT DOCUMENTS

DE   102015114382 A1   3/2017

OTHER PUBLICATIONS

International Patent Application No. PCT/IB2018/056456, International Search Report and Written Opinion, dated May 7, 2019.

*Primary Examiner* — Philip F Gabler
(74) *Attorney, Agent, or Firm* — Kilpatrick Townsend & Stockton LLP

(57) ABSTRACT

A removable privacy panel assembly (100) for a passenger seat includes a center panel (101) with a width approximately equal to a width of the passenger seat and at least one side panel (103, 104) with a connection to the center panel (101) where the at least one side panel extends approximately perpendicular to the center panel. The removable privacy panel assembly includes a deployed configuration where the removable privacy panel assembly is attached to the passenger seat and an uninstalled configuration where the removable privacy panel assembly is detached from the passenger seat. In the deployed configuration, the center panel is approximately aligned with a seatback (11) of the passenger seat and the at least one side panel (103, 104) extends forward from the center panel (101) beyond a seating surface of the passenger seat. In the deployed configuration, the at least one side panel (103, 104) is disposed adjacent to a headrest (15) of the passenger seat.

20 Claims, 6 Drawing Sheets

(56) References Cited

U.S. PATENT DOCUMENTS

| | | | | |
|---|---|---|---|---|
| 5,868,471 | A * | 2/1999 | Graham | B60N 2/885 |
| | | | | 297/397 |
| 5,967,613 | A * | 10/1999 | McKeever | A61G 5/121 |
| | | | | 297/397 |
| 6,273,509 | B1 | 8/2001 | Reithmeier et al. | |
| 6,460,927 | B1 * | 10/2002 | Groth | A61G 5/12 |
| | | | | 297/284.9 |
| 7,393,057 | B2 * | 7/2008 | Fraser | A47C 7/383 |
| | | | | 297/392 |
| 8,857,911 | B2 * | 10/2014 | Aguirre | B64D 11/0643 |
| | | | | 297/411.45 |
| 9,216,665 | B2 * | 12/2015 | Herault | B64D 11/0646 |
| 9,855,874 | B2 * | 1/2018 | Sanchez | B60N 2/882 |
| 10,494,101 | B2 * | 12/2019 | Wilson | B60N 2/809 |
| 2002/0185573 | A1 | 12/2002 | Bisch | |
| 2005/0194827 | A1 * | 9/2005 | Dowty | B60N 2/643 |
| | | | | 297/411.3 |
| 2012/0299356 | A1 * | 11/2012 | Edwards | B60N 2/882 |
| | | | | 297/397 |
| 2016/0130003 | A1 | 5/2016 | Arriola et al. | |
| 2017/0283060 | A1 * | 10/2017 | Papke | B64D 11/0023 |
| 2018/0222589 | A1 * | 8/2018 | Papke | B64D 11/0627 |

* cited by examiner

REMOVABLE MODULAR PRIVACY ASSEMBLY

FIELD OF THE INVENTION

The field of the invention relates to removable modular privacy assemblies for passenger seats in aircraft or the like.

BACKGROUND

Passenger seats, and particularly vehicle or aircraft passenger seats, are designed based on numerous factors including, for example, enhancing comfort, aesthetics, and convenience. In addition, passenger seats and arrays thereof are designed to maximize efficiencies related to available space within the cabin of the vehicle. Due to such efficiencies, conventional seats may be designed with minimal space available for each individual passenger.

In certain situations, it may be desirable to design seats with removable privacy assemblies on the seatback portion of the seat. In particular, it may be desirable to design and produce a removable privacy assembly for creating a personal space, enhancing privacy, and reducing sound and light for the passenger(s) within the personal space.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a removable privacy panel assembly for a passenger seat comprises: a center panel comprising a width approximately equal to a width of the passenger seat; at least one side panel comprising a connection to the center panel and extending approximately perpendicular to the center panel; a deployed configuration, wherein the removable privacy panel assembly is attached to the passenger seat; an uninstalled configuration, wherein the removable privacy panel assembly is detached from the passenger seat; wherein, in the deployed configuration: the center panel is approximately aligned with a seatback of the passenger seat; and the at least one side panel extends forward from the center panel beyond a seating surface of the passenger seat, wherein the at least one side panel is disposed adjacent to a headrest of the passenger seat.

The at least one side panel, in certain embodiments, is approximately aligned with an armrest of the passenger seat.

In certain embodiments, the center panel comprises a cutout corresponding to an upper feature on a rear side of the passenger seat.

In some embodiments, the at least one side panel comprises a hinge such that the at least one side panel pivots relative to the center panel.

In some embodiments, the at least one side panel comprises two side panels on opposite sides of the center panel, wherein the two panels extend approximately parallel to one another.

The connection between the at least one side panel and the center panel, in certain embodiments, comprises a detachable connection.

The removable privacy panel assembly, in some embodiments, further comprises at least one protrusion such that, in the deployed configuration, the at least one protrusion engages a corresponding slot in the passenger seat.

In some embodiments, the center panel comprises a central split such that, in the deployed configuration, a portion of the removable privacy panel assembly is removed and the remaining removable privacy panel assembly is disposed adjacent to approximately half of the seatback of the passenger seat.

In certain embodiments, a lower edge of the at least one side panel comprises a non-linear segment.

In some embodiments, the at least one side panel comprises a curved surface that curves toward a center of passenger seat.

According to certain embodiments of the present invention, a passenger seat comprises: a seatback; a headrest; at least one armrest; and a removable privacy panel assembly comprising: a center panel with a width approximately equal to a width of the seatback; at least one side panel comprising a connection to the center panel and extending approximately perpendicular to the center panel; a deployed configuration; and an uninstalled configuration, wherein, in the deployed configuration: the center panel is approximately aligned with the seatback; and the at least one side panel is approximately aligned with the at least one armrest.

In certain embodiments, the at least one side panel extends forward from the center panel beyond a seating surface of the passenger seat, wherein the at least one side panel is disposed adjacent to the headrest of the passenger seat.

In some embodiments, the center panel comprises a cutout corresponding to an upper feature on a rear side of the passenger seat.

The at least one side panel, in certain embodiments, comprises a hinge such that the at least one side panel pivots relative to the center panel.

In certain embodiments, the at least one side panel comprises two side panels on opposite sides of the center panel, wherein the two panels extend approximately parallel to one another.

In some embodiments, the connection between the at least one side panel and the center panel comprises a detachable connection.

The removable privacy panel assembly, in some embodiments, further comprises at least one protrusion such that, in the deployed configuration, the at least one protrusion engages a corresponding slot in the passenger seat.

In certain embodiments, the center panel comprises a central split such that, in the deployed configuration, a portion of the removable privacy panel assembly is removed and the remaining removable privacy panel assembly is disposed adjacent to approximately half of the seatback of the passenger seat.

In some embodiments, a lower edge of the at least one side panel comprises a non-linear segment.

The at least one side panel, in certain embodiments, comprises a curved surface that curves toward a center of passenger seat.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1A:
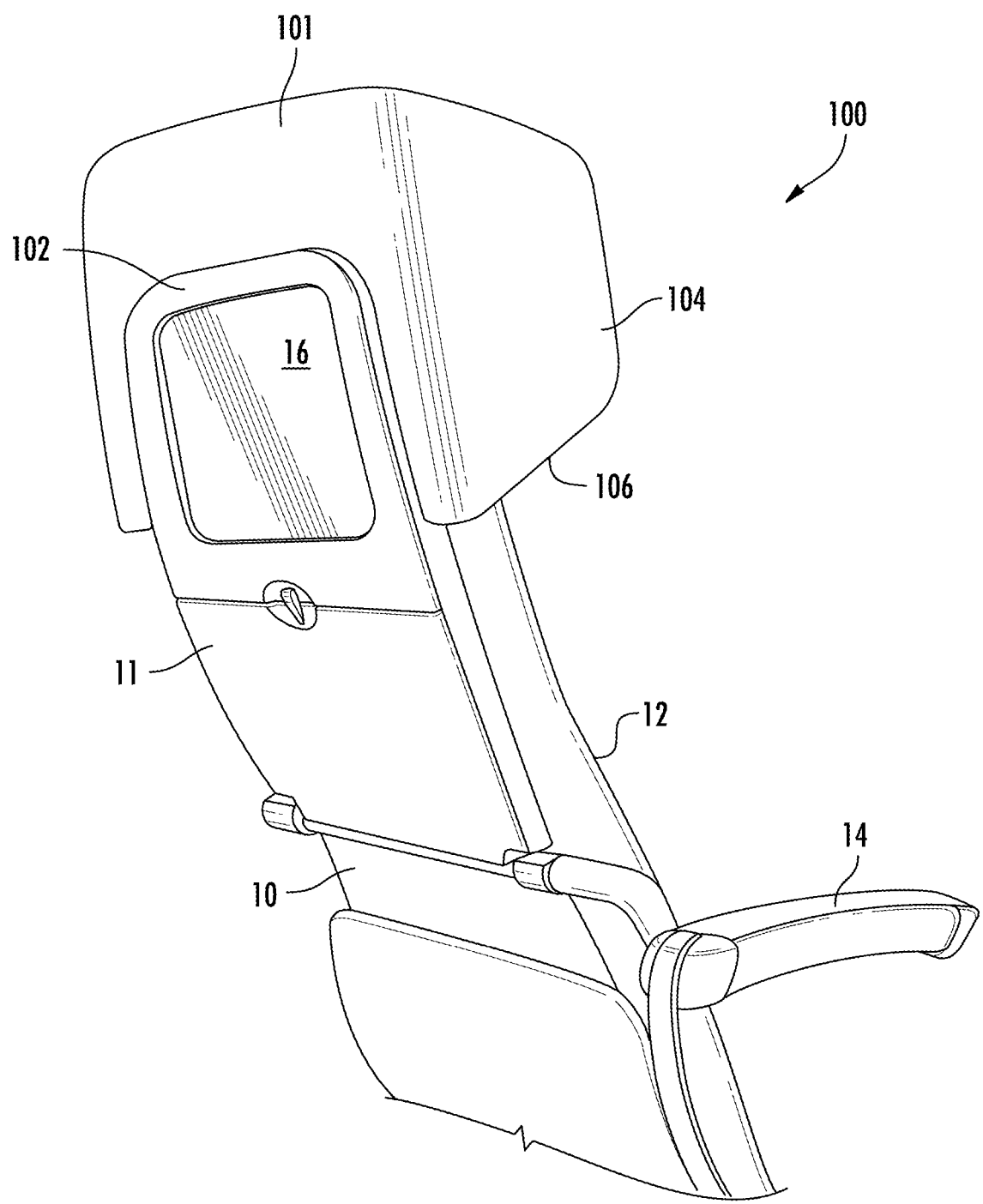
FIG. 1A is a rear perspective view of a removable privacy assembly in a deployed configuration according to certain embodiments of the present invention.
Figure 1B:
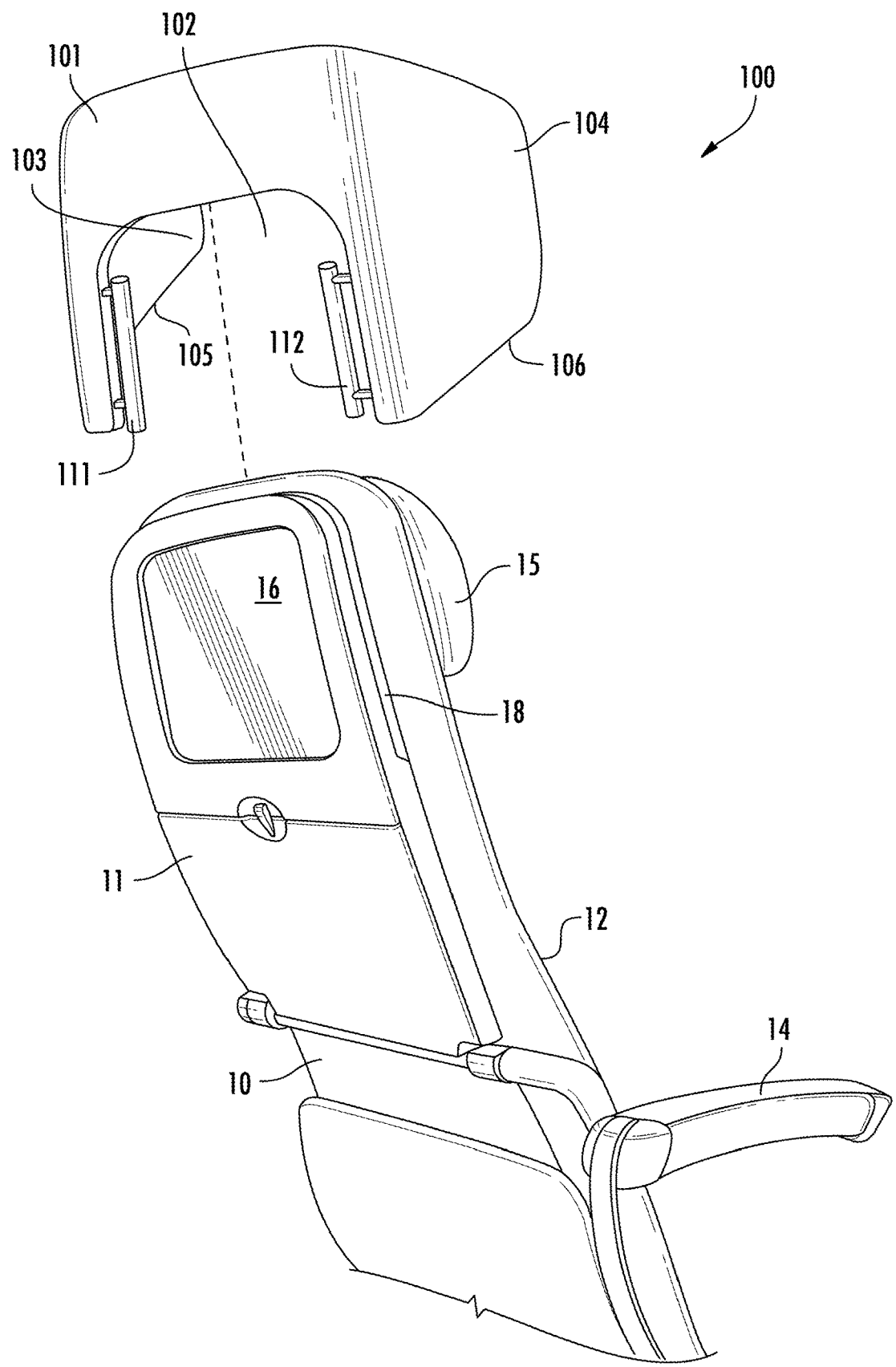
FIG. 1B is a rear perspective view of the removable privacy assembly of FIG. 1A in an uninstalled configuration.
Figure 2:
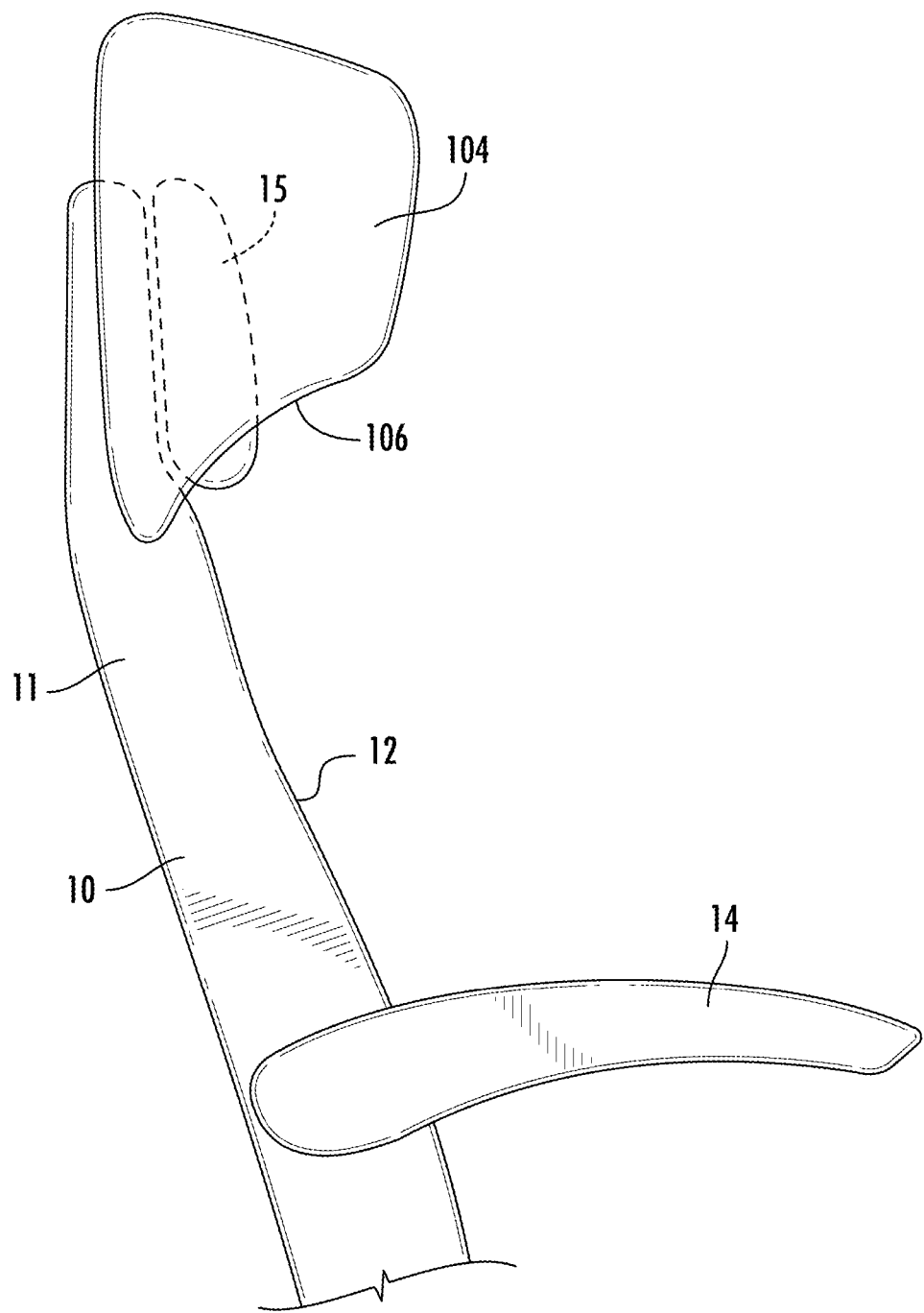
FIG. 2 is a side view of the removable privacy assembly of FIG. 1A.

FIGS. 1A-7 illustrate embodiments of removable privacy panel assemblies 100 for passenger seats 10 in vehicles such as an aircraft. The removable privacy panel assembly 100 may include a center panel 101, a left side panel 103, and a right side panel 104. As shown in FIGS. 1A and 1B, the center panel 101 has a width that is approximately equal to a width of the passenger seat 10. The left side panel 103 and the right side panel 104 each extend from the respective sides of the center panel 101 and are approximately perpendicular to the center panel 101. The left side panel 103 includes a lower edge 105 and the right side panel 104 includes a lower edge 106. The lower edges 105, 106 may be approximately linear (see FIGS. 1A and 1B). In other embodiments, as shown in FIG. 2, the lower edges 105, 106 may be non-linear and may include a curve to form a concave shape to ensure clearance for a passenger's shoulder and/or arm.

As shown in FIG. 1A, the removable privacy panel assembly 100 has a deployed configuration where the removable privacy panel assembly 100 is attached to the passenger seat 10. As shown in FIG. 1B, the removable privacy panel assembly 100 has an uninstalled configuration where the removable privacy panel assembly 100 is detached from the passenger seat 10. In some embodiments, the interface between the center panel 101 and the left side panel 103 (and/or the right side panel 104) may include a hinge to allow for pivotal movement between the center panel 101 and the side panel(s). As one example, pivoting the side panels 103, 104 would reduce the overall space required for storing the removable privacy panel assembly 100 when not in use. In some embodiments, the hinge is not functional when the removable privacy panel assembly 100 is in the deployed configuration.

The center panel 101, in some embodiments, includes a cutout 102 that corresponds to an upper feature 16 on the rear side of the seatback 11 of the passenger seat 10. The upper feature 16 may include at least one of a display screen, a storage compartment, a charging station for electronic devices, or any other appropriate feature. The cutout 102 is illustrated as rectangular (or square) with rounded corners, but the cutout 102 may have any appropriate shape corresponding to the upper feature 16 on the rear side of the seatback 11 of the passenger seat 10.

Figure 3:
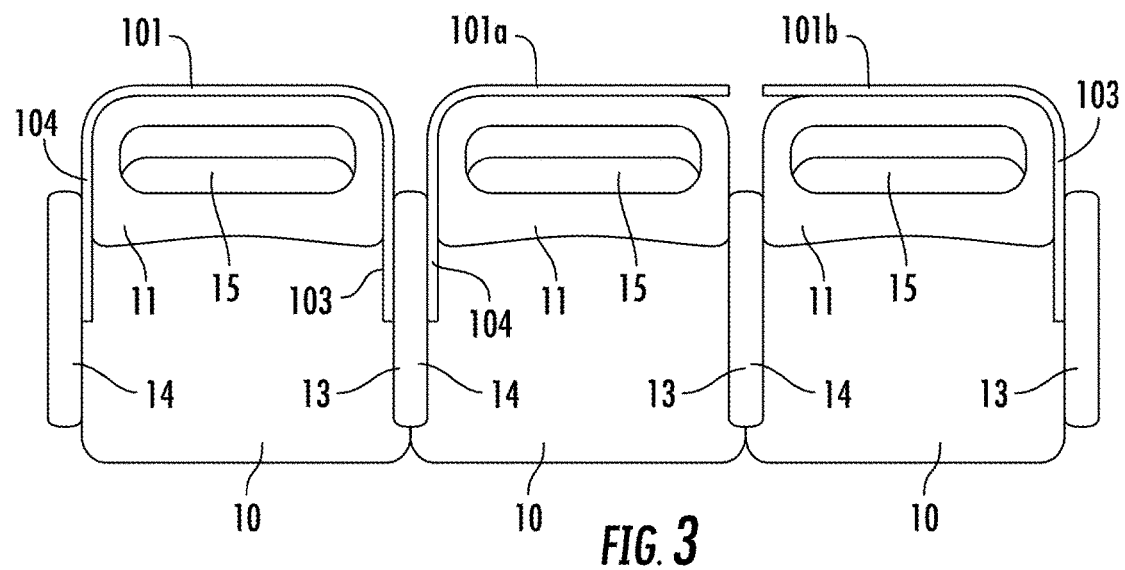
FIG. 3 is a top view of the removable privacy assembly of FIG. 1A.
Figure 5:
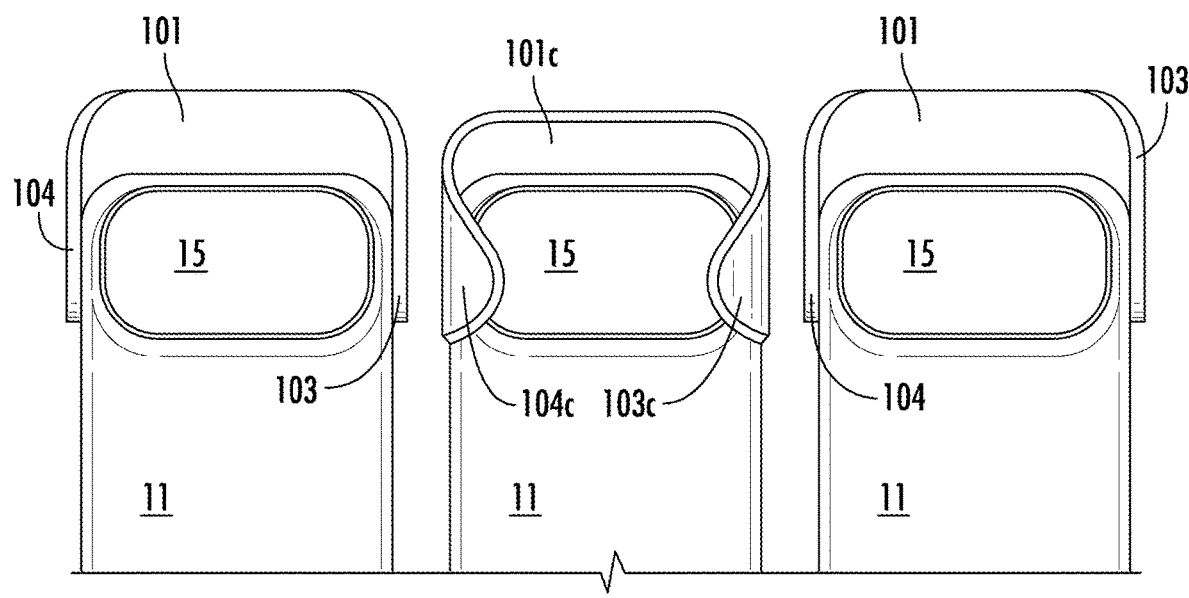
FIG. 5 is a front view of the removable privacy assembly of FIG. 1A.

In the deployed configuration, in certain embodiments, the center panel 101 is approximately aligned with a seatback 11 of the passenger seat 10. The left side panel 103 and the right side panel 104 each extend forward from the center panel 101 beyond a seating surface 12 of the passenger seat 10. As shown in FIGS. 2 and 5, the left side panel 103 and the right side panel 104 may each be disposed adjacent to a headrest 15 of the passenger seat 10. In some embodiments, the left side panel 103 is approximately aligned with a left armrest 13. For example, FIG. 3 shows that the outer surface of the left side panel 103 is approximately aligned with an inner edge of the left armrest 13. Similarly, the right side panel 104 may be approximately aligned with a right armrest 14. For example, FIG. 3 shows that the outer surface of the right side panel 104 is approximately aligned with an inner edge of the right armrest 14. In other embodiments, the side panels 103, 104 may be located further from the center of the seat such that they align with a center of the respective armrest, an outer edge of the armrest, or any other appropriate location. The removable privacy panel assembly 100 may be configured such that adjacent seats can each include a removable privacy panel assembly 100 and the overall width dimension of the seat (including the removable privacy panel assembly 100) does not exceed a maximum value, such as, for example, 45.7 cm (18 in); 63.5 cm (25 in); or any other appropriate value.

In some embodiments, as shown in FIG. 1B, to secure the removable privacy panel assembly 100 in the deployed configuration, the removable privacy panel assembly 100 includes a left side protrusion 111 and a right side protrusion 112 that engage corresponding features in the passenger seat 10. For example, the left side protrusion 111 may engage a slot 17 in the seatback 11 of the passenger seat 10 (see FIG. 7). Similarly, the right side protrusion 112 may engage a slot 18 in the seatback 11 of the passenger seat 10 (see FIGS. 1B and 7). Although the drawings illustrate one example where the protrusions 111, 112 have cylindrical features and the slots 17, 18 have corresponding round cross-sections, these features may have any appropriate shape or cross-section including, for example, dovetail, rectangular, triangular, oval, polygonal, or any other appropriate shape. In some embodiments, based on the configuration of the protrusions and corresponding slots, the removable privacy panel assembly 100 is attached to the seatback 11 of the passenger seat 10 by sliding the removable privacy panel assembly 100 toward the floor of the vehicle in a direction that is approximately parallel to the seatback 11. In other embodiments, the protrusions and slot may be oriented in other directions such that the removable privacy panel assembly 100 can be attached/detached based on movement in other directions (e.g., vertical, perpendicular to the seatback 11, parallel to a fore/aft direction of the vehicle, or any other appropriate direction). In addition, the interface between the protrusions and the respective corresponding slots may include features for securing the removable privacy panel assembly 100 in the deployed configuration. For example, the interface may include a detent or other appropriate feature.

Figure 4:
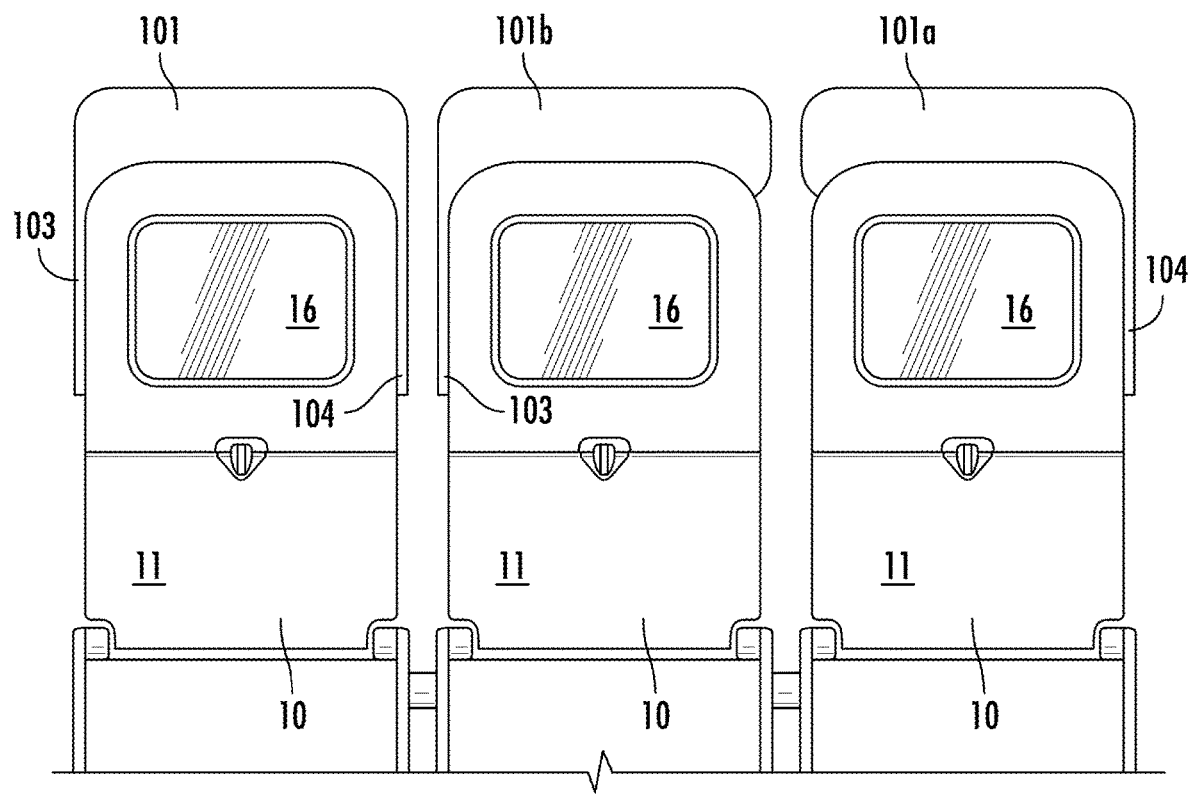
FIG. 4 is a rear view of the removable privacy assembly of FIG. 1A.

In some embodiments, the removable privacy panel assembly 100 includes alternative configurations with only a single side panel (i.e., to provide privacy for a plurality of adjacent seats). For example, as shown in FIGS. 3 and 4, center panel 101*a* includes right side panel 104 but does not include a left side panel. Similarly, center panel 101*b* includes left side panel 103 but does not include a right side panel. In other embodiments, the removable privacy panel assembly 100 is modular such that each side panel 103, 104 can be removed from the center panel 101. In other words, the center panel 101 may include at least one detachable connection at the interface with the side panel(s). For example, center panel 101*a* (shown in FIGS. 3 and 4) includes right side panel 104 installed but the left side panel 103 has been detached. Similarly, center panel 101*b* (shown in FIGS. 3 and 4) includes left side panel 103 installed but the right side panel 104 has been detached. In some embodiments, a side panel can be detached at the detachable connection and can be replaced with a side panel having a different configuration. As one example, the center seat 10 in FIG. 5 shows an example where the left side panel 103 has been detached and replaced with a curved left side panel 103*c* and the right side panel 104 has been detached and replaced with a curved right side panel 104*c*. The curved side panels 103*c*, 104*c* extend forward from the center panel (similar to side panels 103, 104) but also curve toward the center of the seat. In other embodiments, an alternative configuration of the removable privacy panel assembly 100 may be available that includes a center panel 101*c* with fixed attachments to curved side panels 103*c*, 104*c*.

Figure 6:
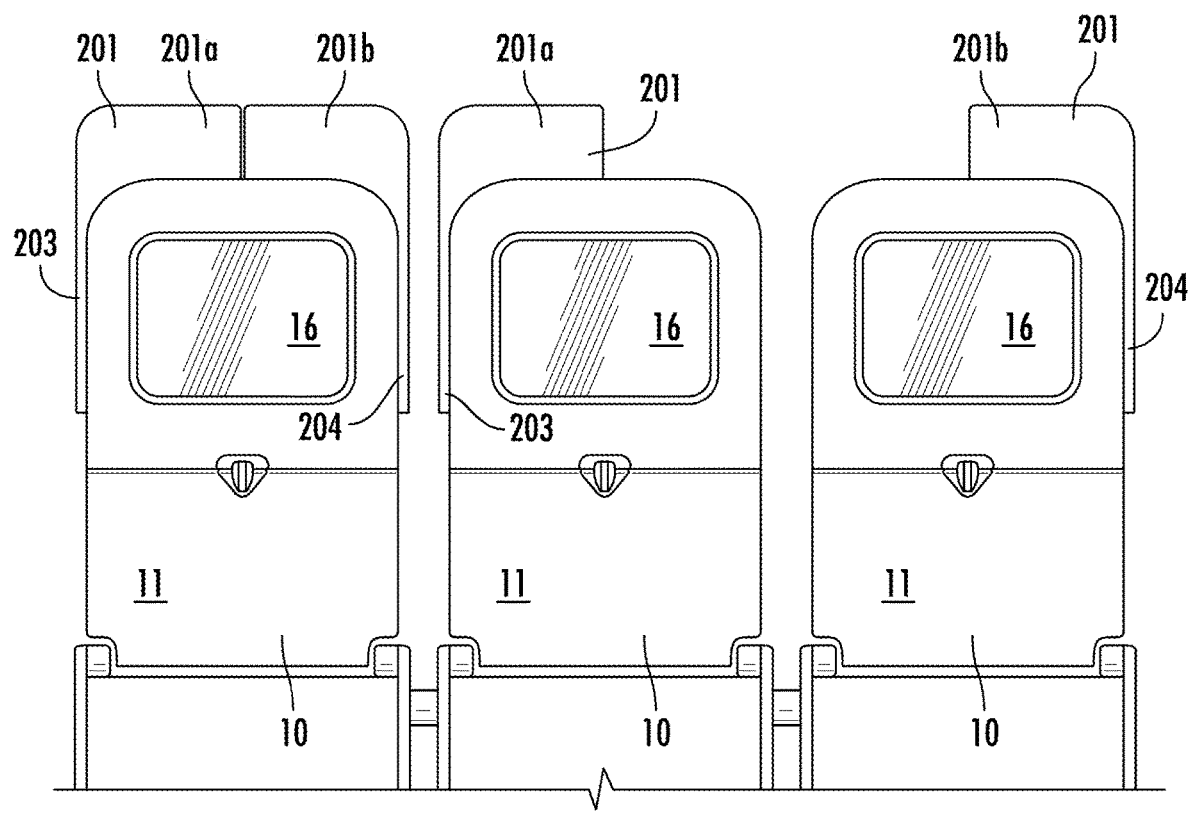
FIG. 6 is a rear view of the removable privacy assembly of FIG. 1A.
Figure 7:
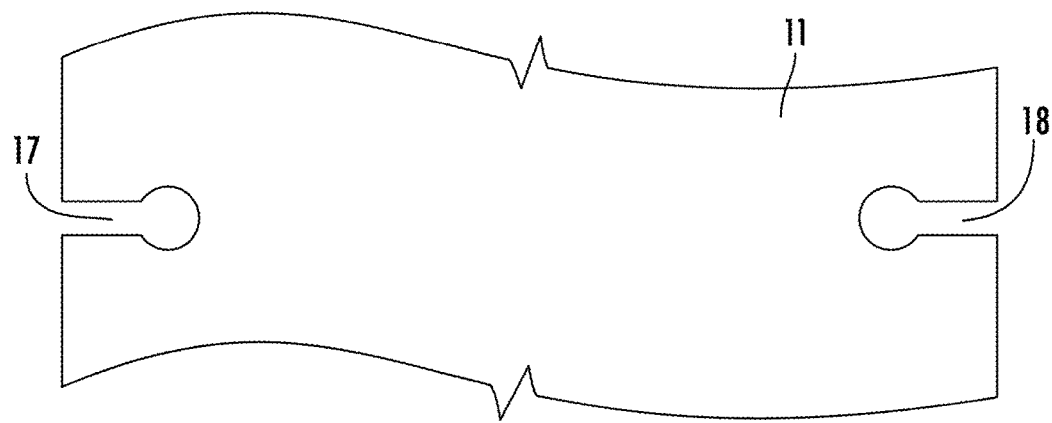
FIG. 7 is a schematic cross-sectional view of slots in a seatback for a joint of the removable privacy assembly of FIG. 1A.

As shown in FIG. 6, in other embodiments, a modular system includes a center panel 201 that includes a central split between a left portion 201*a* and a right portion 201*b*. The left portion 201*a* may include a left side panel 203 and the right portion 201*b* may include a right side panel 204. As shown on the left side of FIG. 6, both the left portion 201*a* and the right portion 201*b* may be attached to the passenger seat 10 such that both side panels are attached. In some embodiments, as shown in FIG. 6, the right portion 201*b* may be detached from the passenger seat 10 such that only the left side panel 203 is attached (see middle seat in FIG. 6). Similarly, as shown for the right side of FIG. 6, the left portion 201*a* may be detached from the passenger seat 10 such that only the right side panel 204 is attached.

The components of the removable privacy panel assembly 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the removable privacy panel assembly 100 may be attached to one another via suitable fasteners, which include, but are not limited to, screws, bolts, rivets, or other mechanical or chemical fasteners.

In the following, further examples are described to facilitate understanding of aspects of the invention:

Example A. A removable privacy panel assembly for a passenger seat comprising:
a center panel comprising a width approximately equal to a width of the passenger seat;
at least one side panel comprising a connection to the center panel and extending approximately perpendicular to the center panel;
a deployed configuration, wherein the removable privacy panel assembly is attached to the passenger seat;
an uninstalled configuration, wherein the removable privacy panel assembly is detached from the passenger seat;
wherein, in the deployed configuration:
the center panel is approximately aligned with a seatback of the passenger seat; and
the at least one side panel extends forward from the center panel beyond a seating surface of the passenger seat, wherein the at least one side panel is disposed adjacent to a headrest of the passenger seat.

Example B. The removable privacy panel assembly of Example A or any of the preceding or subsequent examples, wherein the at least one side panel is approximately aligned with an armrest of the passenger seat.

Example C. The removable privacy panel assembly of Example A or any of the preceding or subsequent examples, wherein the center panel comprises a cutout corresponding to an upper feature on a rear side of the passenger seat.

Example D. The removable privacy panel assembly of Example A or any of the preceding or subsequent examples, wherein the at least one side panel comprises a hinge such that the at least one side panel pivots relative to the center panel.

Example E. The removable privacy panel assembly of Example A or any of the preceding or subsequent examples, wherein the at least one side panel comprises two side panels on opposite sides of the center panel, wherein the two panels extend approximately parallel to one another.

Example F. The removable privacy panel assembly of Example A or any of the preceding or subsequent examples, wherein the connection between the at least one side panel and the center panel comprises a detachable connection.

Example G. The removable privacy panel assembly of Example A or any of the preceding or subsequent examples, further comprising at least one protrusion such that, in the deployed configuration, the at least one protrusion engages a corresponding slot in the passenger seat.

Example H. The removable privacy panel assembly of Example A or any of the preceding or subsequent examples, wherein the center panel comprises a central split such that, in the deployed configuration, a portion of the removable privacy panel assembly is removed and the remaining removable privacy panel assembly is disposed adjacent to approximately half of the seatback of the passenger seat.

Example I. The removable privacy panel assembly of Example A or any of the preceding or subsequent examples, wherein a lower edge of the at least one side panel comprises a non-linear segment.

Example J. The removable privacy panel assembly of Example A or any of the preceding or subsequent examples, wherein the at least one side panel comprises a curved surface that curves toward a center of passenger seat.

Example K. A passenger seat comprising:
a seatback;
a headrest;
at least one armrest; and
a removable privacy panel assembly comprising:
a center panel with a width approximately equal to a width of the seatback;
at least one side panel comprising a connection to the center panel and extending approximately perpendicular to the center panel;
a deployed configuration; and an uninstalled configuration, wherein, in the deployed configuration:

the center panel is approximately aligned with the seatback; and the at least one side panel is approximately aligned with the at least one armrest.

Example L. The passenger seat of Example K or any of the preceding or subsequent examples, wherein the at least one side panel extends forward from the center panel beyond a seating surface of the passenger seat, wherein the at least one side panel is disposed adjacent to the headrest of the passenger seat.

Example M. The passenger seat of Example K or any of the preceding or subsequent examples, wherein the center panel comprises a cutout corresponding to an upper feature on a rear side of the passenger seat.

Example N. The passenger seat of Example K or any of the preceding or subsequent examples, wherein the at least one side panel comprises a hinge such that the at least one side panel pivots relative to the center panel.

Example O. The passenger seat of Example K or any of the preceding or subsequent examples, wherein the at least one side panel comprises two side panels on opposite sides of the center panel, wherein the two panels extend approximately parallel to one another.

Example P. The passenger seat of Example K or any of the preceding or subsequent examples, wherein the connection between the at least one side panel and the center panel comprises a detachable connection.

Example Q. The passenger seat of Example K or any of the preceding or subsequent examples, wherein the removable privacy panel assembly further comprises at least one protrusion such that, in the deployed configuration, the at least one protrusion engages a corresponding slot in the passenger seat.

Example R. The passenger seat of Example K or any of the preceding or subsequent examples, wherein the center panel comprises a central split such that, in the deployed configuration, a portion of the removable privacy panel assembly is removed and the remaining removable privacy panel assembly is disposed adjacent to approximately half of the seatback of the passenger seat.

Example S. The passenger seat of Example K or any of the preceding or subsequent examples, wherein a lower edge of the at least one side panel comprises a non-linear segment.

Example T. The passenger seat of Example K or any of the preceding or subsequent examples, wherein the at least one side panel comprises a curved surface that curves toward a center of passenger seat.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A removable privacy panel assembly for a passenger seat comprising:

a center panel comprising a central split that defines a left portion and a right portion, wherein the center panel has a width approximately equal to a width of the passenger seat;

at least one side panel comprising a connection to the center panel and extending approximately perpendicular to the center panel;

a deployed configuration, wherein the removable privacy panel assembly is attached to the passenger seat;

an uninstalled configuration, wherein the removable privacy panel assembly is detached from the passenger seat; and wherein, in the deployed configuration:

the center panel is approximately aligned with a seatback of the passenger seat and at least one of the left portion and the right portion of the removable privacy panel assembly can be removed and a remaining one of the at least one of the left portion and the right portion of the removable privacy panel assembly can be disposed adjacent to approximately half of the seatback of the passenger seat.

2. The removable privacy panel assembly of claim 1, further comprising a passenger seat comprising:

a seatback;

a headrest; and at least one armrest.

3. The removable privacy panel assembly of claim 2, wherein the at least one side panel is approximately aligned with the at least one armrest.

4. The removable privacy panel assembly of claim 2, wherein the at least one side panel is approximately aligned with the at least one armrest.

5. The removable privacy panel assembly of claim 2, wherein the at least one side panel extends forward from the center panel beyond a seating surface of the passenger seat, wherein the at least one side panel is disposed adjacent to a headrest of the passenger seat.

6. The passenger seat of claim 2, wherein the center panel comprises a cutout corresponding to an upper feature on a rear side of the passenger seat.

7. The passenger seat of claim 2, wherein the at least one side panel comprises a hinge such that the at least one side panel pivots relative to the center panel.

8. The passenger seat of claim 2, wherein the at least one side panel comprises two side panels on opposite sides of the center panel, wherein the two side panels extend approximately parallel to one another.

9. The passenger seat of claim 2, wherein the connection between the at least one side panel and the center panel comprises a detachable connection.

10. The passenger seat of claim 2, wherein the removable privacy panel assembly further comprises at least one protrusion such that, in the deployed configuration, the at least one protrusion engages a corresponding slot in the passenger seat.

11. The passenger seat of claim 2, wherein a lower edge of the at least one side panel comprises a non-linear segment.

12. The passenger seat of claim 2, wherein the at least one side panel comprises a curved surface that curves toward a center of passenger seat.

13. The removable privacy panel assembly of claim 1, wherein the at least one side panel extends forward from the center panel beyond a seating surface of the passenger seat, wherein the at least one side panel is disposed adjacent to a headrest of the passenger seat.

14. The removable privacy panel assembly of claim 1, wherein the center panel comprises a cutout corresponding to an upper feature on a rear side of the passenger seat.

15. The removable privacy panel assembly of claim 1, wherein the at least one side panel comprises a hinge such that the at least one side panel pivots relative to the center panel.

16. The removable privacy panel assembly of claim 1, wherein the at least one side panel comprises two side panels on opposite sides of the center panel, wherein the two side panels extend approximately parallel to one another.

17. The removable privacy panel assembly of claim 1, wherein the connection between the at least one side panel and the center panel comprises a detachable connection.

18. The removable privacy panel assembly of claim 1, further comprising at least one protrusion such that, in the deployed configuration, the at least one protrusion engages a corresponding slot in the passenger seat.

19. The removable privacy panel assembly of claim 1, wherein a lower edge of the at least one side panel comprises a non-linear segment.

20. The removable privacy panel assembly of claim 1, wherein the at least one side panel comprises a curved surface that curves toward a center of passenger seat.

\* \* \* \* \*